(12) United States Patent
Idehara

(10) Patent No.: US 6,438,605 B1
(45) Date of Patent: *Aug. 20, 2002

(54) COMMUNICATION EQUIPMENT, COMMUNICATION ROUTE SELECTION METHOD, AND COMPUTER PROGRAM PRODUCT IN MEMORY FOR SELECTING A COMMUNICATION ROUTE

(75) Inventor: Takenori Idehara, Machida (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,584

(22) Filed: Nov. 10, 1998

(30) Foreign Application Priority Data

Nov. 17, 1997 (JP) .............................................. 9-330832

(51) Int. Cl.⁷ ............................................. G06F 15/173
(52) U.S. Cl. ....................... 709/238; 709/202; 709/223; 709/240; 709/242; 709/244; 370/235; 370/236; 370/351
(58) Field of Search ............................... 709/200–203, 709/205–207, 220–224, 238–244; 370/235–238, 254, 351, 354, 400–401; 455/412–419, 445, 461–469; 358/402–403, 440–442

(56) References Cited

U.S. PATENT DOCUMENTS

| | | | | |
|---|---|---|---|---|
| 5,398,012 A | * | 3/1995 | Derby et al. ................ | 370/238 |
| 5,430,729 A | * | 7/1995 | Rahnema .................... | 709/242 |
| 5,577,207 A | * | 11/1996 | Pauget et al. ............... | 709/230 |
| 5,742,905 A | * | 4/1998 | Pepe et al. .................. | 455/461 |
| 5,774,654 A | * | 6/1998 | Maki .......................... | 709/238 |
| 5,805,298 A | * | 9/1998 | Ho et al. .................... | 358/402 |
| 5,881,233 A | * | 3/1999 | Toyoda et al. .............. | 358/402 |
| 5,974,236 A | * | 10/1999 | Sherman ..................... | 709/221 |
| 5,983,269 A | * | 11/1999 | Mattson et al. ............. | 709/221 |
| 6,044,075 A | * | 3/2000 | Le Boudec et al. ......... | 709/238 |
| 6,101,526 A | * | 8/2000 | Mochizuki .................. | 709/200 |

FOREIGN PATENT DOCUMENTS

| | | | | |
|---|---|---|---|---|
| JP | 9-8940 | 1/1997 | .......... | H04M/11/00 |
| JP | 9-69890 | 3/1997 | .......... | H04M/11/00 |
| JP | 9-114756 | 5/1997 | .......... | H04M/11/00 |

\* cited by examiner

*Primary Examiner*—Bharat Barot
(74) *Attorney, Agent, or Firm*—Morrison & Foerster LLP

(57) ABSTRACT

A communication equipment having multiple communication functions, a method of selecting a communication route among multiple communication routes that are available between the sending equipment and receiving equipment, and a computer program product in memory for implementing the communication route selecting process. In route selection mode, a list of communication routes that are available between the sending equipment and receiving equipment is produced and displayed. The user selects a route and associated communication function on the displayed list, and proceeds to communication.

28 Claims, 15 Drawing Sheets

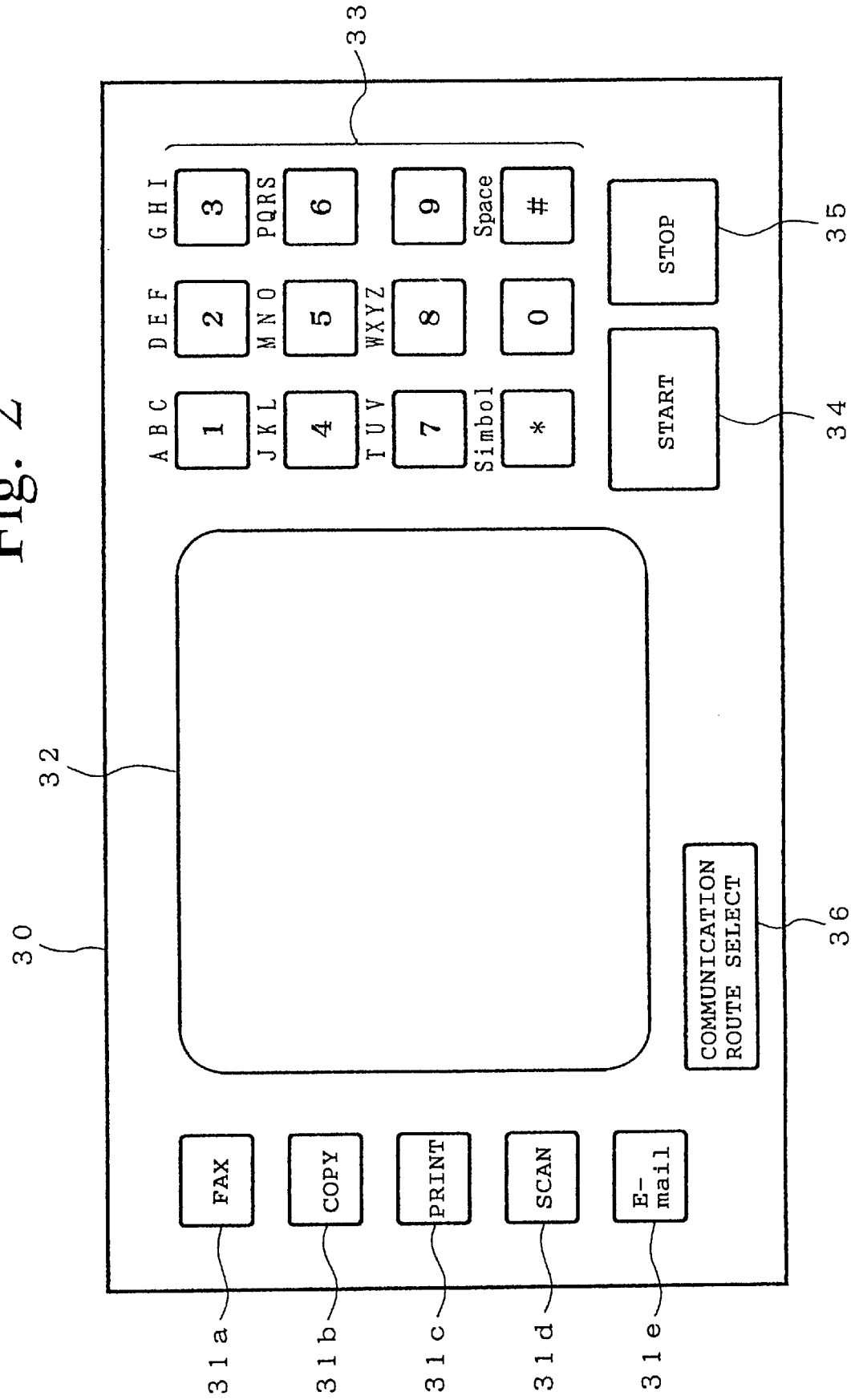

Fig. 3(a)

| EQUIPMENT | COMMUNICATION MANNER | DESIGNATION DATA |
|---|---|---|
| RECEIVING EQUIPMENT | FAX(T30) NETWORK(E-MAIL) NETWORK(PRINT) | 03-12312 FAX.com.jp IP150.16.00 |

Fig. 3(b)

| EQUIPMENT | COMMUNICATION MANNER | DESIGNATION DATA |
|---|---|---|
| SENDING EQUIPMENT | FAX(T30) NETWORK(E-MAIL) | RECEIVING SIDE PHONE NUMBER RECEIVING SIDE E-MAIL ADDRESS |

Fig. 3(c)

| EQUIPMENT | COMMUNICATION MANNER | DESIGNATION DATA |
|---|---|---|
| SENDING EQUIPMENT | FAX(T30) NETWORK(E-MAIL) | 03-12312 FAX.com.jp |

Fig. 10(a)

| EQUIPMENT | COMMUNICATION MANNER | DESIGNATION DATA |
|---|---|---|
| SENDING SIDE PERSONAL COMPUTER TO FAX 1 | FAX(T30) | RECEIVING SIDE PHONE NUMBER |
| SENDING SIDE PERSONAL COMPUTER | FAX MODEDM(T30) | RECEIVING SIDE PHONE NUMBER |
| | NETWORK(E-MAIL) | RECEIVING SIDE MAIL ADDRESS |
| | NETWORK(PRINT) | RECEIVING SIDE IP ADDRESS |

Fig. 10(b)

| EQUIPMENT | COMMUNICATION MANNER | DESIGNATION DATA |
|---|---|---|
| FAX | FAX | 03-12312 |
| | NETWORK(E-MAIL) | FAX.com.jp |
| | NETWORK(PRINT) | IP150.16.00 |
| SENDING SIDE PERSONAL COMPUTER | FAX MODEDM(T30) | 03-12356 |
| | | PC.com.jp |
| FAX TO RECEIVING SIDE PERSONAL COMPUTER | FAX(T30) SUB-ADDRESS NETWORK (E-MAIL TRANSFER) | 12 PC.com.jp |

Fig. 11

| COMMUNICATION ROUTE | ADDRESS-1 | ADDRESS-2 |
|---|---|---|
| SENDING EQUIPMENT A → MODEM A → MODEM B → RECEIVING EQUIPMENT B | FAX NUMBER OF MODEM B | |
| SENDING EQUIPMENT A → MODEM A → FAX 2 → RECEIVING EQUIPMENT B | FAX NUMBER OF FAX 2 | IP ADDRESS OF SENDING EQUIPMENT |
| SENDING EQUIPMENT A → MODEM A → FAX 2 → E-MAIL → RECEIVING EQUIPMENT B | FAX NUMBER OF FAX 2 | E-MAIL ADDRESS |
| SENDING EQUIPMENT A → FAX 1 → MODEM B → RECEIVING EQUIPMENT B | FAX NUMBER OF MODEM B | |
| SENDING EQUIPMENT A → FAX 1 → FAX 2 → RECEIVING EQUIPMENT B | FAX NUMBER OF FAX 2 | IP ADDRESS OF SENDING EQUIPMENT |
| SENDING EQUIPMENT A → FAX 1 → FAX 2 → E-MAIL → RECEIVING EQUIPMENT B | FAX NUMBER OF FAX 2 | E-MAIL ADDRESS |
| SENDING EQUIPMENT A → E-MAIL → RECEIVING EQUIPMENT B | E-MAIL ADDRESS | |

COMMUNICATION EQUIPMENT, COMMUNICATION ROUTE SELECTION METHOD, AND COMPUTER PROGRAM PRODUCT IN MEMORY FOR SELECTING A COMMUNICATION ROUTE

This application is based on patent application No. 9-330832 filed in Japan, the contents of which is hereby incorporated by reference.

BACKGROUND OF THE INVENTION

1. Field of the Invention

The present invention relates to a communication equipment having multiple communication functions, a communication route selection method, and a computer program product in memory for selecting a communication route.

2. Description of the Prior Art

When information is sent to the receiving party, it is generally sent depending on the communication function equipped on the communication equipment of the receiving party. For example, in case the receiving equipment has the facsimile function (will be termed "FAX function" hereinafter), information is sent by use of its FAX function. In case the receiving equipment has the electronic mail function (will be termed "E-mail function" hereinafter), information is sent by use of its E-mail function. In case the receiving equipment has the Internet FAX function, information is sent by use of its Internet FAX function. In case the sending equipment and receiving equipment are connected through a LAN (local area network), information can be sent by use of the LAN.

Some communication equipments developed recently have multiple communication functions among the above-mentioned FAX function, E-mail function, Internet FAX function, and LAN connecting function. In the case of communication between these multi-functional communication equipment, the sending party is allowed to send information by choosing a proper communication function of the receiving equipment, instead of installing plural communication equipments having different functions.

These multi-functional communication equipment allow the sending party to choose a communication function depending on individual communication purposes. For example, for low-cost communication, the expensive FAX communication can be avoided. For retaining the high-quality image transfer, the LAN connecting function or E-mail function can be used. In the latter case, however, communication based on E-mail cannot be achieved unless the receiving person operates the computer to open the mail box. In contrast, the FAX communication produces a print of information on the receiving equipment, and it can be handed to the receiving person. Accordingly, the FAX communication can possibly be faster practically than the E-mail communication, and the former may be chosen occasionally.

The Internet FAX function will be explained. In sending information by using FAX, the telephone line fee is charged, and therefore the communication fee depends on the distance between a sending party and a receiving party. A conceivable manner of low-cost communication to a distant receiving party is the use of the Internet, and it is called "Internet FAX function".

It is assumed that the sending party has FAX unit F1, intermediate FAX units F2 and F3 are connected through the Internet, and the receiving party has FAX unit F4, of which F1 and F2 are located in town A, and F3 and F4 are located in remote town B. In this situation, information is sent from F1 to F2 in the same town over the telephone line, it is sent from F2 to F3 through the Internet, and it is sent from F3 to F4 in the same town over the telephone line. This information sending manner enables a low communication fee based on the use of the Internet for long-distance communication between town A and town B.

Among other information sending manners, the sending party can connect its FAX F1 directly to the Internet, or the sending party can connect its FAX F1 to the LAN which has the connection with the Internet.

Although multi-functional communication units allow the sending party to choose the best communication function based on the judgement of situation as explained above, the conventionally available multi-functional communication equipment do not inform the sending party of what communication function has the receiving equipment, or as to whether the receiving equipment has a communication function that matches with the function of the self equipment, causing the sending party to be troubled in choosing a communication function or to send information by using a function that is not the best.

SUMMARY OF THE INVENTION

A prime object of the present invention is to provide an innovative communication equipment capable of sending information from the sending equipment to the receiving equipment based on the selection of a proper communication route from among multiple available communication routes.

Another object of the present invention is to provide an innovative communication equipment capable of sending information from the sending equipment to the receiving equipment based on the finding of multiple communication routes that are available between these equipments and the selection of a communication route among the found communication routes.

Still another object of the present invention is to provide a method of selecting a communication route among multiple communication routes that are available between the sending equipment and receiving equipment.

Still another object of the present invention is to provide a computer program product in memory for implementing the process of selecting a communication route among multiple communication routes that are available between the sending equipment and receiving equipment.

Other objects of the present invention will become apparent from the following detailed description of embodiments taken in conjunction with the accompanying drawings.

BRIEF DESCRIPTION OF THE DRAWINGS

FIG. 2 is a front view of the operation panel of the facsimile unit as a communication equipment;

FIGS. 3(*a*), 3(*b*) and 3(*c*) are diagrams showing examples of display on the LCD display screen, listing available communication means;

FIG. 10(a) and FIG. 10(b) are diagrams showing an example of display on the LCD display screen, listing available communication means;

FIG. 11 is a table showing examples of communication means that are available between the sending equipment and receiving equipment;

DETAILED DESCRIPTION OF THE PREFERRED EMBODIMENTS

Embodiments of the present invention will be explained.

First Embodiment

Figure 1:
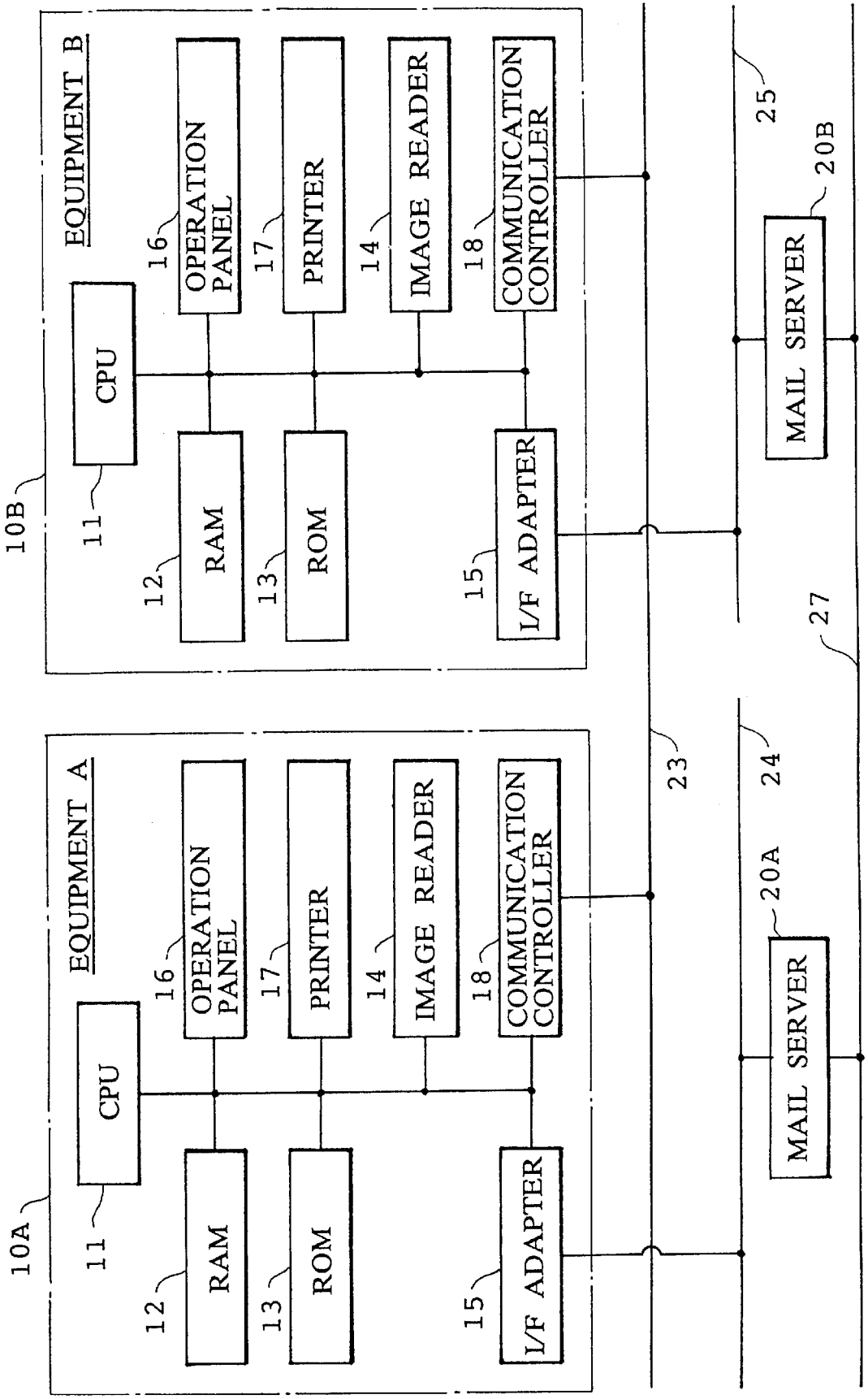
FIG. 1 is a block diagram showing a first example of the communication network.

FIG. 1 shows a communication network pertinent to the first embodiment of this invention. The network includes equipment A which is a facsimile (FAX) equipment 10A and unit B which is a FAX unit 10B. These FAX units 10A and 10B are connected to the telephone line 23 through communication controller 18, and also connected through their interface adapters 15 to Ethernets, e.g., LANs,24 and 25, respectively, with these Ethernets 24 and 25 being connected through mail servers 20A and 20B, respectively, to the Internet 27.

The following explains the sending of document data from the FAX unit 10A to the FAX unit 10B.

Each of the FAX units 10A and 10B, which is controlled by a CPU 11, has a RAM 12 for temporarily storing document data of a source document which has been read and document data which has been received, a ROM 13 for storing control programs, an image reader 14 which reads the text in an optical manner, an interface adapter 15 which connects the FAX unit to the Ethernet, an operation panel 16, a printer 17, and a communication controller 18 which connects the FAX unit to the telephone line.

Among these functional devices, the image reader 14, printer 17, interface adapter 15, communication controller 18, and mail servers 20A and 20B are known of their structures and functions, and detailed explanation thereof will be omitted.

FIG. 2 shows the operation panel 30 of the sending FAX unit 10A. The operation panel 30 has a FAX mode select key 31a, a copy mode select key 31b, a print mode select key 31c, a scan mode select key 31d, an E-mail select key 31e, and an LCD display screen 32 which displays the selected mode and the state of the unit and allows data input based on the laminated touch-panel.

Among the operational modes selected by the mode selection keys of the FAX unit 10A, the copy mode is to read the source text and make a copy of it, the print mode is to print data received by facsimile and stored in the memory, and the scan mode is to send document data which has been read on the sending FAX unit 10A to the personal computer and the scan mode is operable when reception program initiated in response to the detection of document data from the FAX is stored in the personal computer. These operational modes selected with the mode selection keys, however, do not relate directly to the communication route selection which will be explained later.

The operation panel 30 further includes a ten-key set 33 which is used to enter numerals and also enter alphabetic characters in the E-mail mode. The ten-key set 33 is designed to allow the entry of a comma, space and symbols, in addition to the alpha-numeric characters and symbols * and # that are labeled on the key tops. For example, when the key "1" is hit once, numeral "1" is entered; when it is hit twice, character "A" is entered; when it is hit three times, "B" is entered; when it is hit four times, "C" is entered; and when it is hit gain, the initial condition is restored to enter "1". The entered character is displayed on the LCD display screen 32. When the key "*" ishitonce, symbol,"*" is entered; when it is hit twice, symbol "@" is entered; when it is hit three times, symbol "&" is entered; and when it is hit four times, symbol "¥" is entered. When the key "#" is hit once, symbol "#" is entered; and when it is hit twice, a space is entered. The entered symbol is displayed on the LCD display screen 32.

The operation panel 30 further includes a start key 34 which is used to start the operation of the FAX unit 10A, a stop key 35 which is used to terminate the operation, and a communication route selection mode key 36 which is used to bring the unit into the mode of selecting a image data transfer route.

The receiving FAX unit 10B may have the same operation panel, or may include mode selection keys for other operational modes.

FIGS. 3(a), 3(b) and 3(c) show displays on the LCD display screen 32 when the communication route has been selected by the operation of the communication route selection mode key 36 on the operation panel 30.

FIG. 3(a) shows the display of communication means that are available for the receiving equipment B, FIG. 3(b) shows the display of communication means that are available for the sending equipment A, and FIG. 3(c) shows the display of the result of arrangement, indicating that FAX and E-mail are available as common means of communication from the sending equipment A to the receiving equipment B.

Figure 4:
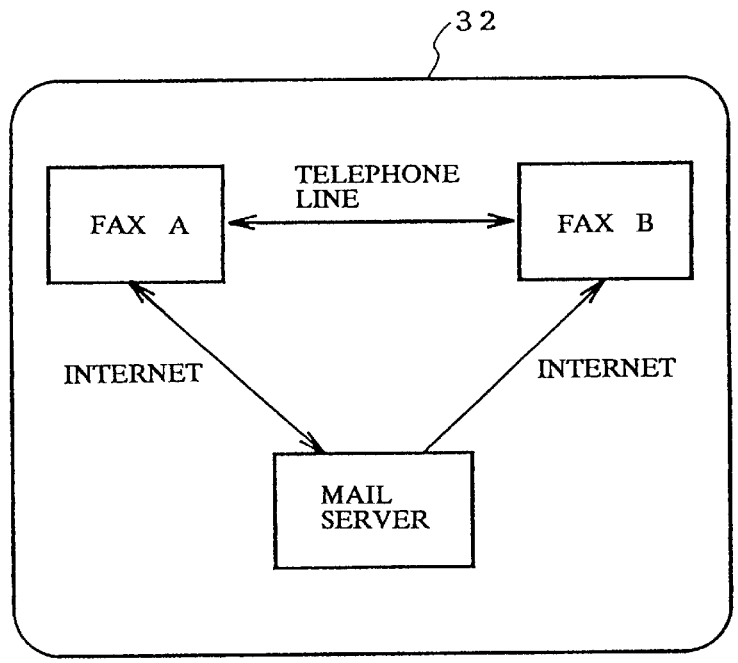
FIG. 4 is a diagram showing an example of display on the LCD display screen at the selection of a communication route.

FIG. 4 shows the display on the LCD display screen 32 at the selection of a communication route, prompting the selection of a communication route for the case of the available communication means shown in FIG. 3(c). When the user touches a screen position on the line, i.e., telephone line 23 in this example, connecting between FAX-A 10A and FAX-B 10B, or a screen position in a block of facility, i.e., mail server 20B in this example, the touched position is detected by the touch-panel on the LCD display screen 32, and the corresponding communication route is selected.

Figure 5:
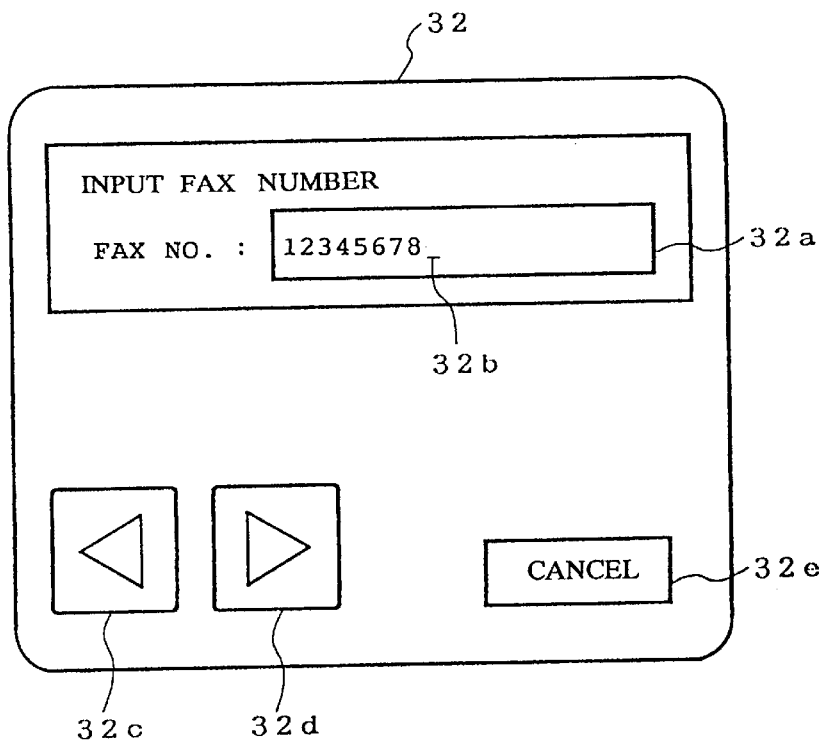
FIG. 5 is a diagram showing an example of display on the LCD display screen at the entry of the receiving equipment identification number.

FIG. 5 shows the display on the LCD display screen 32 when the unit is in the initial state or after the FAX mode key 31a has been depressed. The display includes a Fax number field 32a, a cursor 32b in the field 32a, cursor moving keys 32c and 32d, and a cancel key 32e which is used to delete the numeral at the cursor position. When a FAX number is entered with the ten-key set 33, each digit is entered and displayed at the position of the cursor 32b.

Next, the processes implemented by the CPU 11 of FIG. 1 for the selection of a communication route and the sending and reception of document data will be explained on the flowcharts of FIG. 6 and FIG. 7.

Figure 6:
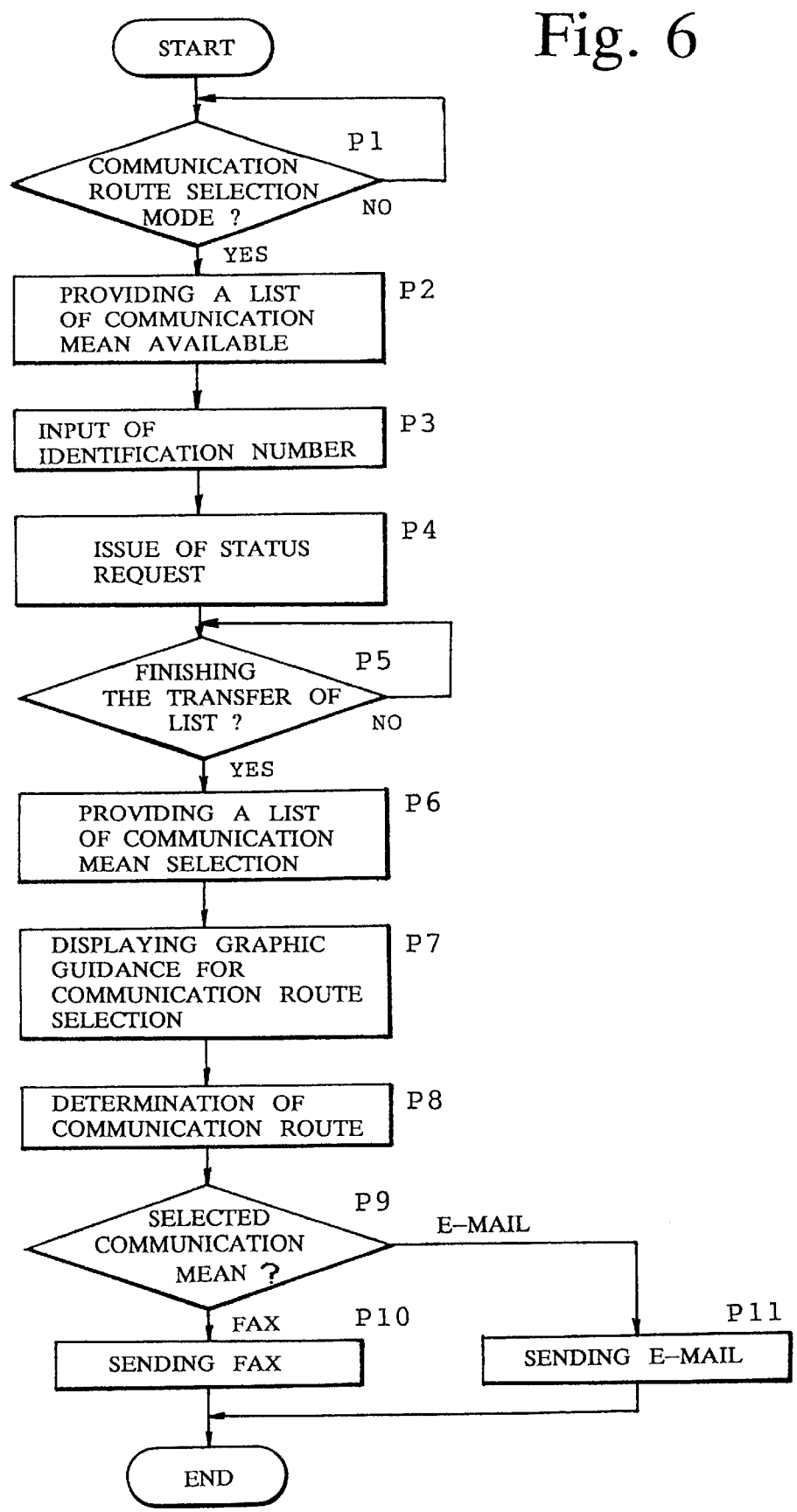
FIG. 6 is a flowchart showing the processing carried out by the CPU of the sending equipment for selecting a communication route.

FIG. 6 is a flowchart showing the processing of communication route selection and document data transfer implemented by the CPU 11 of the sending equipment A. It is detected whether the communication route selection mode which is invoked with the communication route selection mode key 36 is selected or not (step P1). When the communication route selection mode is selected, there is provided a list of communication means available for the sending equipment A as shown in FIG. 3(b) (step P2).

Next, the user is prompted to enter the receiving equipment identification number. On the LCD display screen 332 of the operation panel 30, with the display of FIG. 5 appearing in response to the setting of the communication route selection mode, the user enters the FAX number of the receiving party with the ten-key set 33 (step P3). The entered FAX number is dialed automatically, and the sending equipment (FAX-A) and receiving equipment (FAX-B) are linked through the telephone line.

The CPU 11 issues a status request to the receiving equipment B in order to examine the state of the receiving equipment B, i.e., it requests the transfer of a list of communication means that are available for the receiving equipment B as shown in FIG. 3(a) (step P4). The CPU 11 waits for the transfer of the list of available communication means from the receiving equipment B (step P5).

On receiving the list of available communication means from the receiving equipment B, a communication means selection list (refer to FIG. 3(c)) is produced from the list of communication means available at the sending equipment A (refer to FIG. 3(b)) and the list of communication means available for the receiving equipment B (refer to FIG. 3(a)) (step P6), and displays a graphic guidance for communication route selection (refer to FIG. 4) on the LCD display screen 32 (step P7). In response to the user's operation on the LCD display screen 32, the communication route and communication means are determined (step P8).

The sending equipment A reads the source document and sends document data to the receiving equipment B by using the selected communication means over the selected communication route, i.e., by using FAX or E-mail based on the selection and determination of communication route and means (steps P9, P10 and P11), and terminates the operation.

Figure 7:
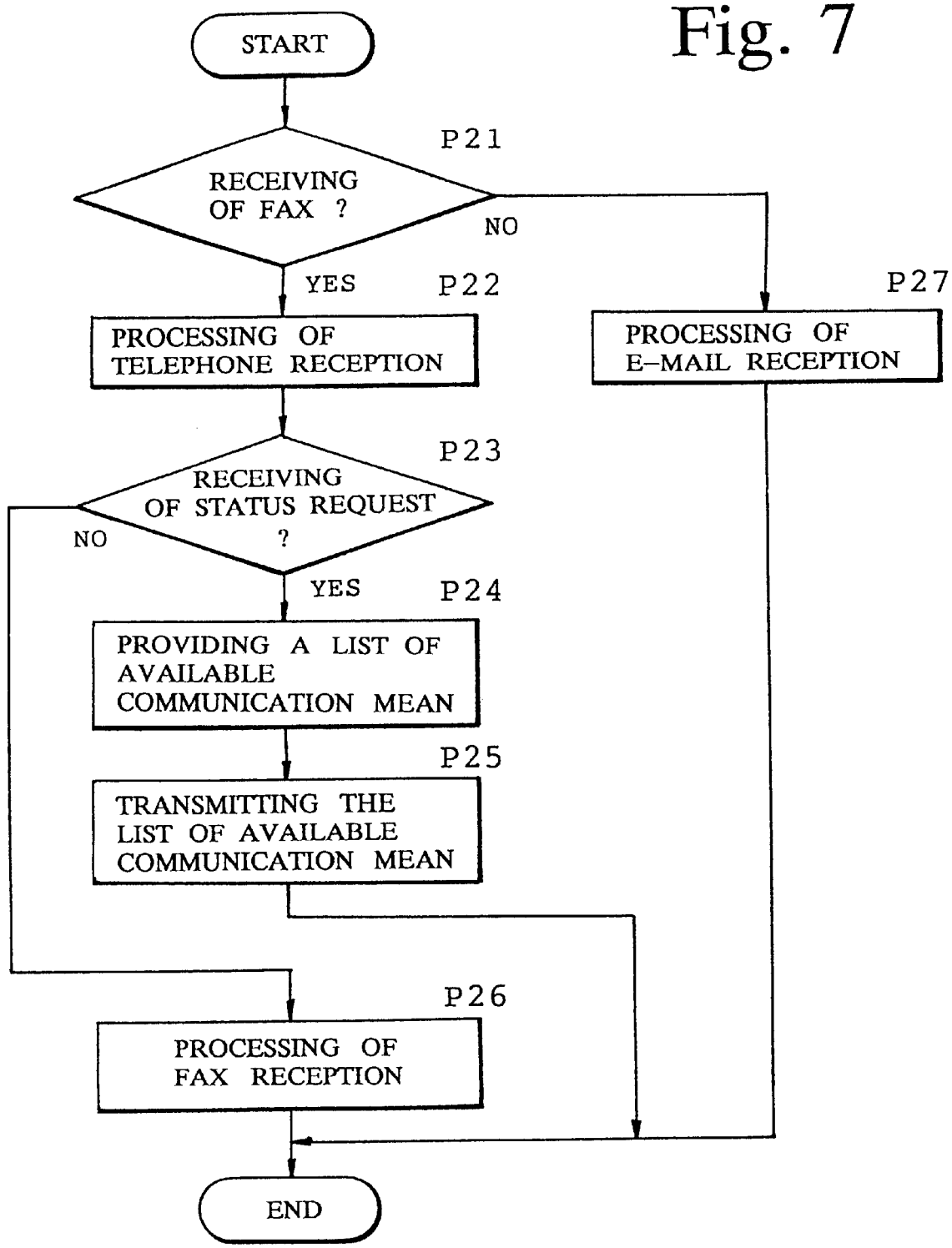
FIG. 7 is a flowchart showing the processing carried out by the CPU of the receiving equipment for sending a list of available communication means.

FIG. 7 is a flowchart showing the transmitting of available communication means list and reception of document data implemented by the receiving equipment B. It is judged whether document data is received by FAX or E-mail or not (step P21). In case of E-mail reception, the processing of E-mail reception is implemented (step P27), and the operation is terminated.

In case of FAX reception in step P21, the processing of telephone reception is implemented (step P22), and subsequently it is judged whether a status request from the sending equipment A is received or not (step P23). On receiving the status request, a list of available communication means is produced and the list is transmitted to the sending equipment A (steps P24 and P25), and the operation is terminated.

Otherwise, in response to the negation of the status request judgement in step P23, the processing of FAX reception is implemented (step P26), and the operation is terminated.

Second Embodiment

Next, the second embodiment of this invention will be explained.

Figure 8:
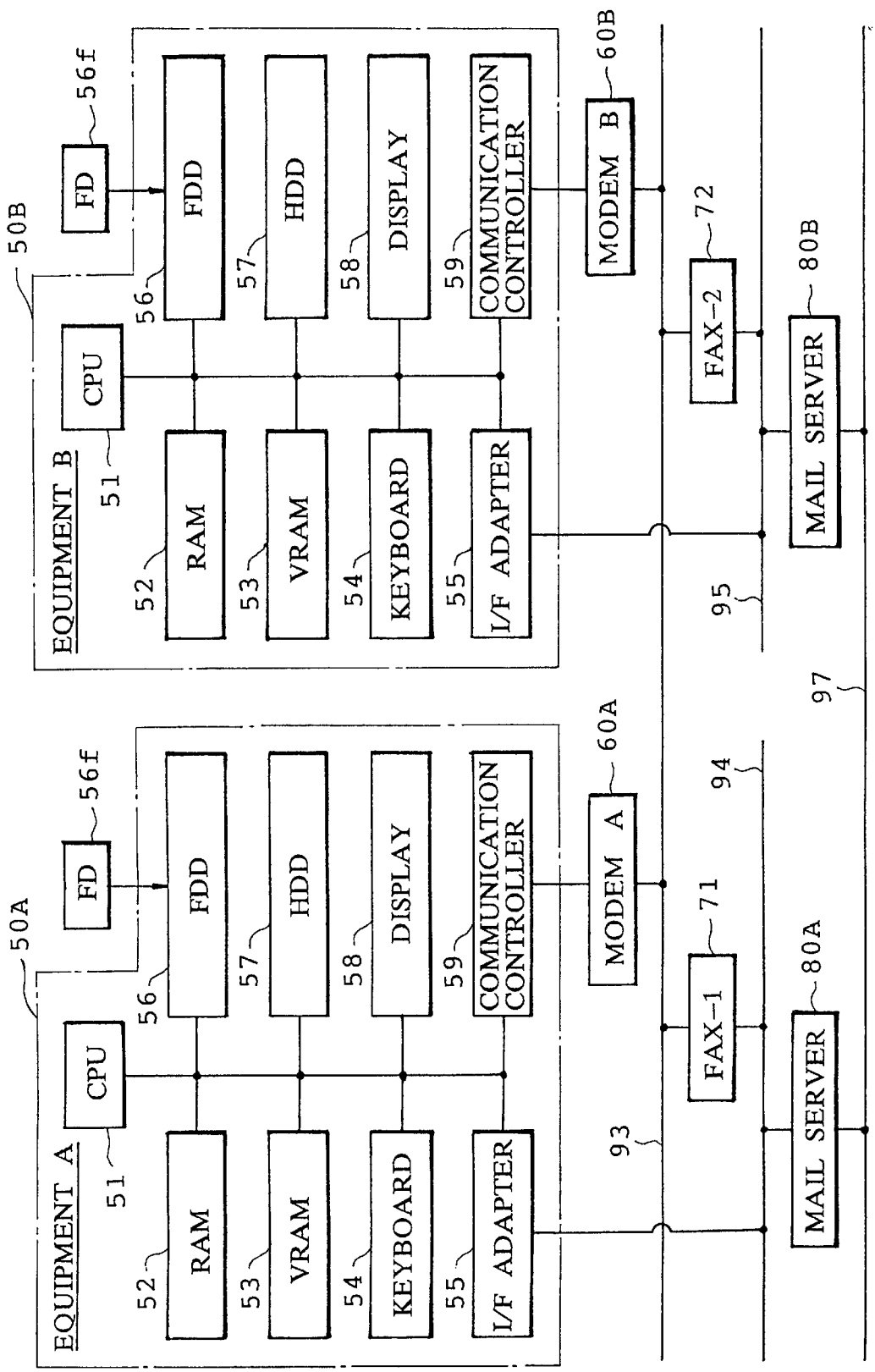
FIG. 8 is a block diagram showing a second example of a the communication network.

FIG. 8 shows a communication network including equipment A which is a personal computer 50A and equipment B which is a personal computer 50B. These computers 50A and 50B are connected to the telephone line 93 through their modems 60A and 60B, and also connected through their interface adapters 55 to Ethernets, e.g., LANs, 94 and 95, respectively, with these Ethernets 94 and 95 being connected through mail servers 80A and 80B, respectively, to the Internet 97. The network further includes a facsimile unit (FAX-1) 71 and another facsimile unit (FAX-2) 72 both connected to the telephone line 93 and also connected to Ethernets 94 and 95, respectively.

The following explains the transfer of data from the equipment A, i.e., personal computer 50A, to the equipment B, i.e., personal computer 50B.

Each of the personal computers 50A and 50B, which is controlled by a CPU 51, has a RAM 52 for temporarily storing document data of a source document which has been read and document data which has been received, a VRAM 53 for storing control programs, a keyboard 54, an interface adapter 55, a floppy disk drive (FDD) 56 floppy disk 56f, a hard disk drive (HDD) 57, a display 58, and a communication controller 59 which connects the personal computer to the telephone line.

Among these functional devices, the personal computers 50A and 50B, FAX units 71 and 72, and mail servers 80A and 80B are known of their structures and functions, and detailed explanation thereof will be omitted.

Figure 9:
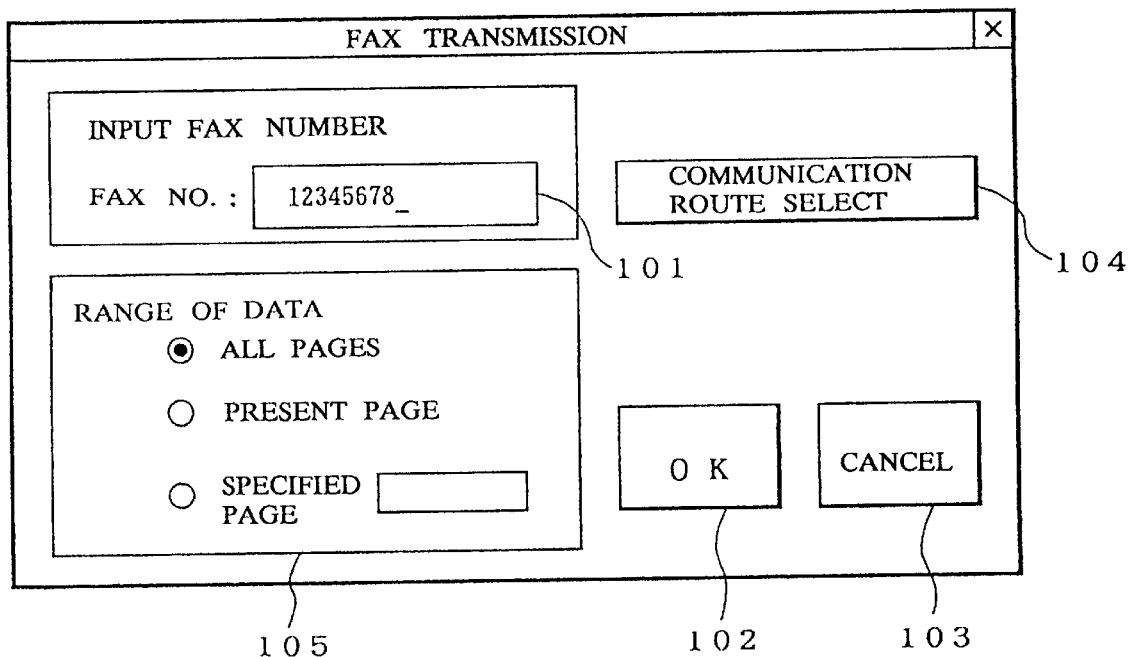
FIG. 9 is a diagram showing an example of the FAX sending dialog box which is displayed on the display screen of the sending at the call of the FAX sending menu.

FIG. 9 shows the FAX sending dialog box which is displayed on the display screen 58 of the personal computer 50A in response to the call of the FAX sending menu from an application program running currently on the equipment A. The user enters the FAX number of the receiving equipment B in the field 101. By clicking the OK key 102 with the mouse device, the data specified in the range field 105 is sent to the equipment B. The user can point the cancel key 103 and click the mouse device to turn off the FAX sending dialog box and return to the application program.

The dialog box further includes a communication route selection mode key 104. By clicking the key 104 with the mouse device, the unit enters the mode for selecting a communication route between the sending equipment A, i.e., personal computer 50A, and the receiving equipment B, i.e., personal computer 50B, with lists of available communication routes being displayed.

FIG. 10(a) shows a display of communication routes available for the sending equipment A, and FIG. 10(b) shows a display of communication routes available for the receiving equipment B.

FIG. 11 is a list of communication means available as common for communication between the sending equipment A and the receiving equipment B resulting from the tables of FIGS. 10(a) and 10(b). On the table of FIG. 11, column "address-1" indicates the address of the first destination of document data from the sending equipment A, and column "address-2" indicates the address of the final destination of document data. An IP address means an Internet Protocol address.

Figure 12:
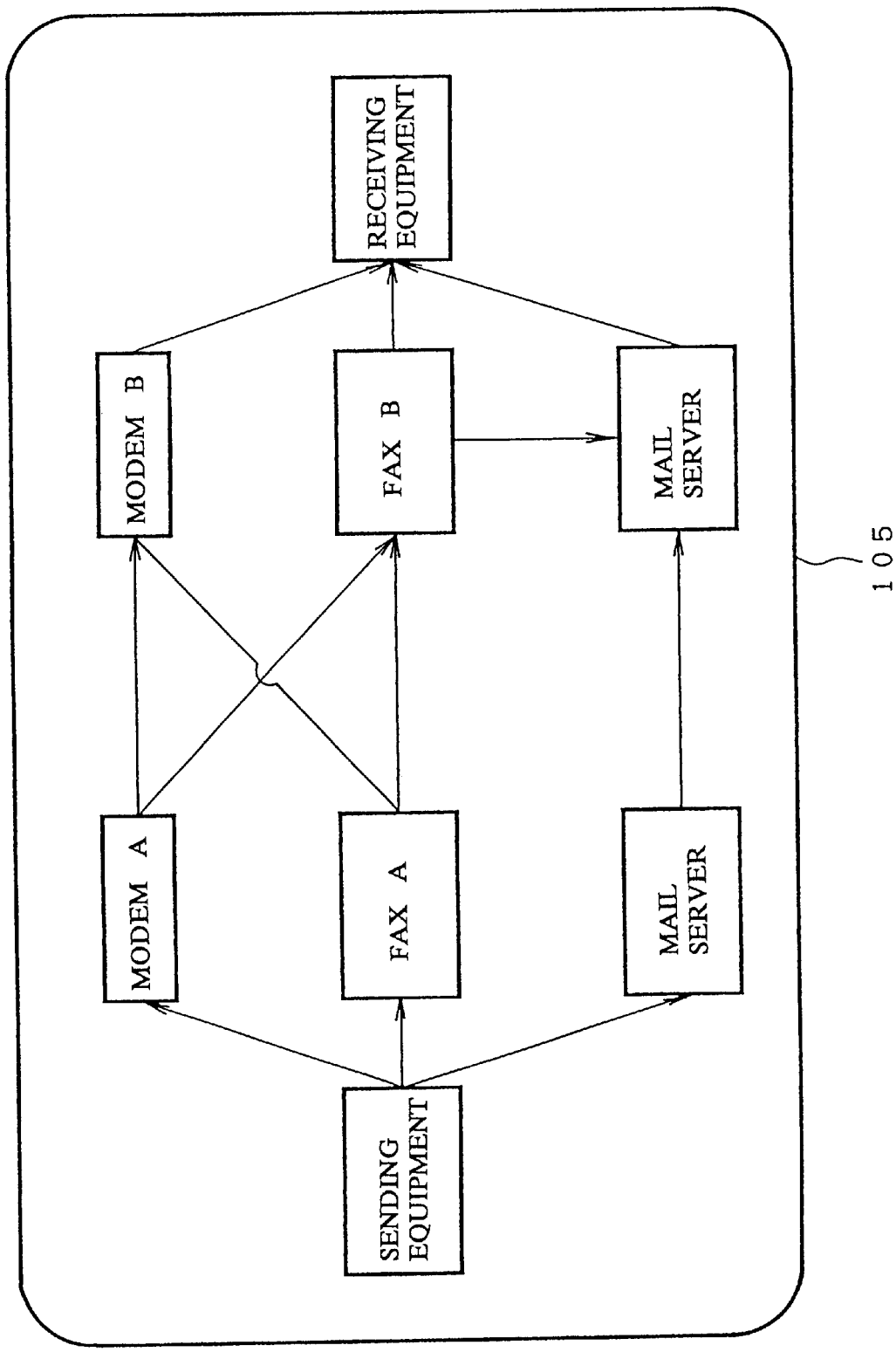
FIG. 12 is a diagram showing an example of display on the LCD display screen at the selection of a communication route.

FIG. 12 shows a display on the LCD display screen 105 when communication route selection mode key. 104 is depressed, and this example is for the case where the communication means listed in FIG. 11 are available. The user selects a communication route by sequentially clicking the mouse device while pointing a line or a facility (FAX 1, FAX 2, modem A, modem B, or mail server in this example) located between the sending equipment A and the receiving equipment B.

Next, the processes implemented by the CPU 51 of FIG. 8 for the selection of a communication route and the transfer of image data will be explained on the flowcharts of FIG. 13 through FIG. 16.

Figure 13:
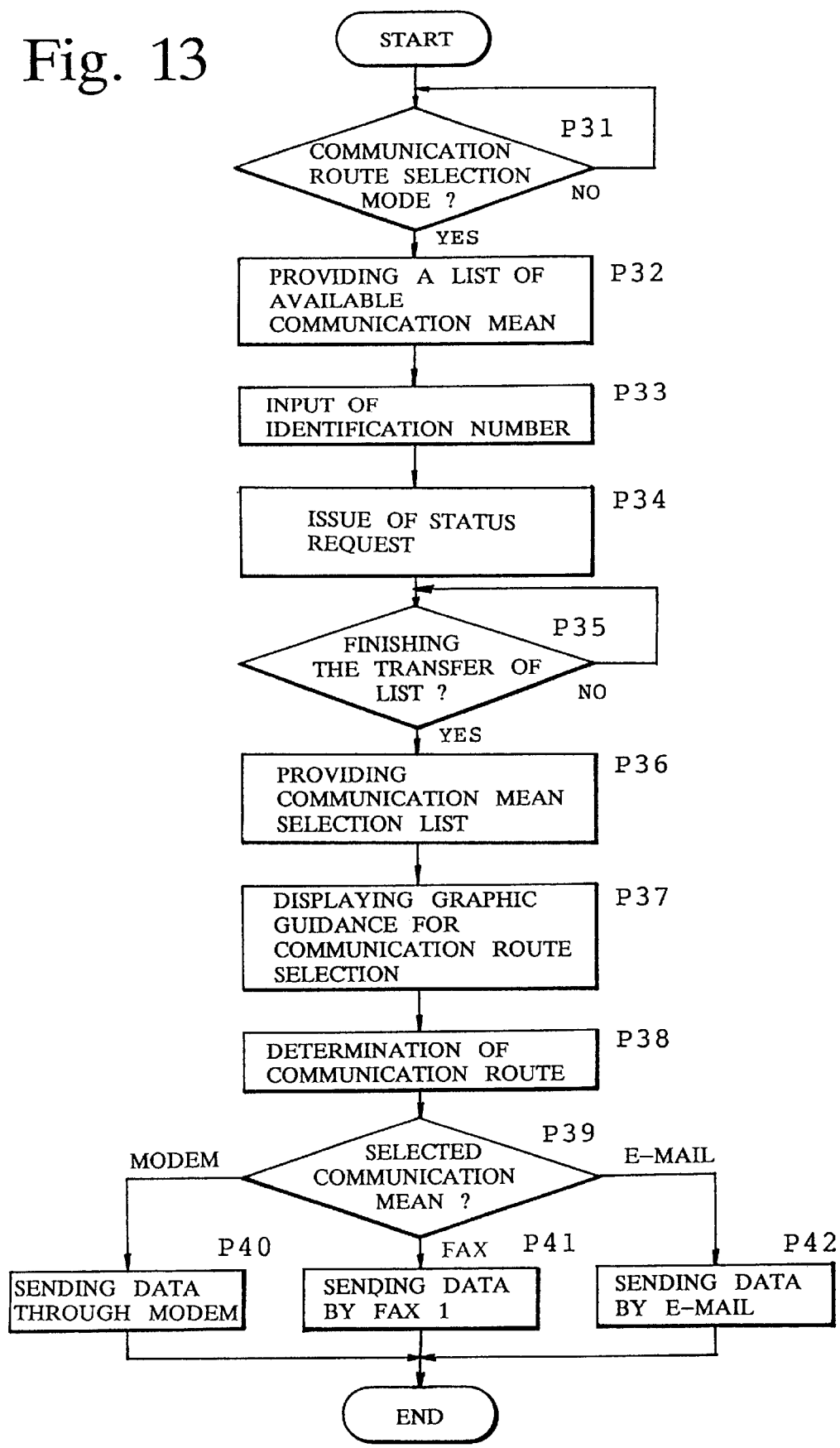
FIG. 13 is a flowchart showing the processing carried out by the CPU of the sending equipment for selecting a communication route.

FIG. 13 is a flowchart showing the processing of communication route selection and document data transferring implemented by the CPU 51 of the sending equipment A.

It is detected whether the communication route selection mode key is pointed and clicked in the dialog box in the display or not (step P31). When the route selection mode is selected, there is provided a list of communication means available for the sending equipment A as shown in FIG. 10(*a*) (step P32). This listing process will be explained in detail later on the flowchart of FIG. 14.

Subsequently, the communication route selection dialog box is displayed to prompt the user to enter the FAX number of the receiving equipment B in the FAX number field. The user operates the ten-key set to enter the destination FAX number (step P33). The entered FAX number is dialed automatically, and the sending equipment and receiving equipment are linked through the telephone line.

The CPU 51 issues a status request to the receiving equipment B in order to examine the state of the receiving equipment B, i.e., it requests the transfer of a list of communication means that are available for the receiving equipment (step P34). The CPU 51 waits for the transfer of the list of available communication means from the receiving equipment B (step P35).

On receiving the list of available communication means from the receiving equipment B, a communication means selection list (refer to FIG. 11) is produced from the list of communication means available for the sending equipment A (refer to FIG. 10(*a*)) and the list of communication means available for the receiving equipment B (refer to FIG. 10(*b*)) (step P36), and a graphic guidance for the communication route selection (refer to FIG. 12) is displayed on the display screen 105 (step P37).

In response to the user's operation on the display, the communication route and communication means are determined (step P38).

The sending equipment A reads the source document, and sends document data to the receiving equipment B by using the selected communication means over the selected communication route, i.e., by using the modem A, FAX-1 or mail server based on the selection and determination of communication route and means (steps P39, P40, P41 and P42), and terminates the operation.

Next, the process of step P40 on the flowchart of FIG. 13 for sending document data to the receiving equipment B via the determined communication route and modem A will be explained. The process is carried out based on the modem communication program stored on the hard disk of the sending equipment A, with the destination FAX number being set to the program.

In case the communication route is from equipment A→ modem A→ modem B and to equipment B, the FAX number of modem B is used on the first row of the address-1 column in the table of FIG. 11 to carry out the FAX communication.

In case the communication route is from equipment A→ modem A→ FAX 2 and to equipment B, the FAX number of FAX 2 is used on the second row of the address-1 column and the sub-address (address-2) for the transfer of document data from the FAX 2 to the equipment B in the table of FIG. 11 to carry out the FAX communication. Document data is transferred from the FAX 2 to the equipment B over the network, and therefore the sub-address (address-2) is the IP address (Internet Protocol address) of the equipment B.

In case the communication route is from equipment A→ modem A→ modem FAX 2 and to equipment B via E-mail, the FAX number of FAX 2 is used on the third row of the address-1 column and the sub-address (address-2) for the transfer of document data from the FAX 2 to the equipment B in the table of FIG. 11 to carry out the FAX communication. Document data is transferred from the FAX 2 to the equipment B via E-mail, and therefore the sub-address (address-2) is the E-mail address of the equipment B.

Next, the process of step P41 on the flowchart of FIG. 13 for sending document data to the receiving equipment B via the determined communication route and FAX 1 will be explained. The process is carried out based on the program for the FAX 1 stored on the hard disk of the sending equipment A.

In case the communication route is from equipment A→ FAX 1→ modem B and to equipment B, the FAX number of modem B is used on the fourth row of the address-1 column in the table of FIG. 11 to carry out the FAX transfer.

In case the communication route is from equipment A→ FAX 1→ FAX 2 and to equipment B, the FAX number of FAX 2 is used on the fifth row of the address-1 column and the sub-address (address-2) for the transfer of document data from the FAX 2 to the equipment B in the table of FIG. 11 to carry out the FAX transfer. Document data is transferred from the FAX 2 to the equipment B over the network, and therefore the sub-address (address-2) is the IP address (Internet Protocol address) of the equipment B.

In case the communication route is from equipment A→ FAX 1→ FAX 2 and to equipment B via E-mail, the FAX number of FAX 2 is used on the sixth row of the address-1 column and the sub-address (address-2) for the transfer of document data from the FAX 2 to the equipment B in the table of FIG. 11 to carry out the FAX transfer. Document data is transferred from the FAX 2 to the equipment B via E-mail, and therefore the sub-address (address-2) is the E-mail address of the equipment B.

Next, the process of step P42 on the flowchart of FIG. 13 for sending document data to the receiving equipment B via the determined communication route and communication means of E-mail will be explained. The process is carried out based on the program for E-mail stored on the hard disk of the sending equipment A, with the receiving equipment number being set to the E-mail server.

The destination mail address is determined with reference to the E-mail address on the seventh row of the address-1 column in the table of FIG. 11. The determined E-mail address is set to the program for E-mail, and image data is transferred to the specified address of the E-mail server. The user of the receiving equipment B will be notified of the delivery of an E-mail, and receive the document data from the E-mail server.

Figure 14:
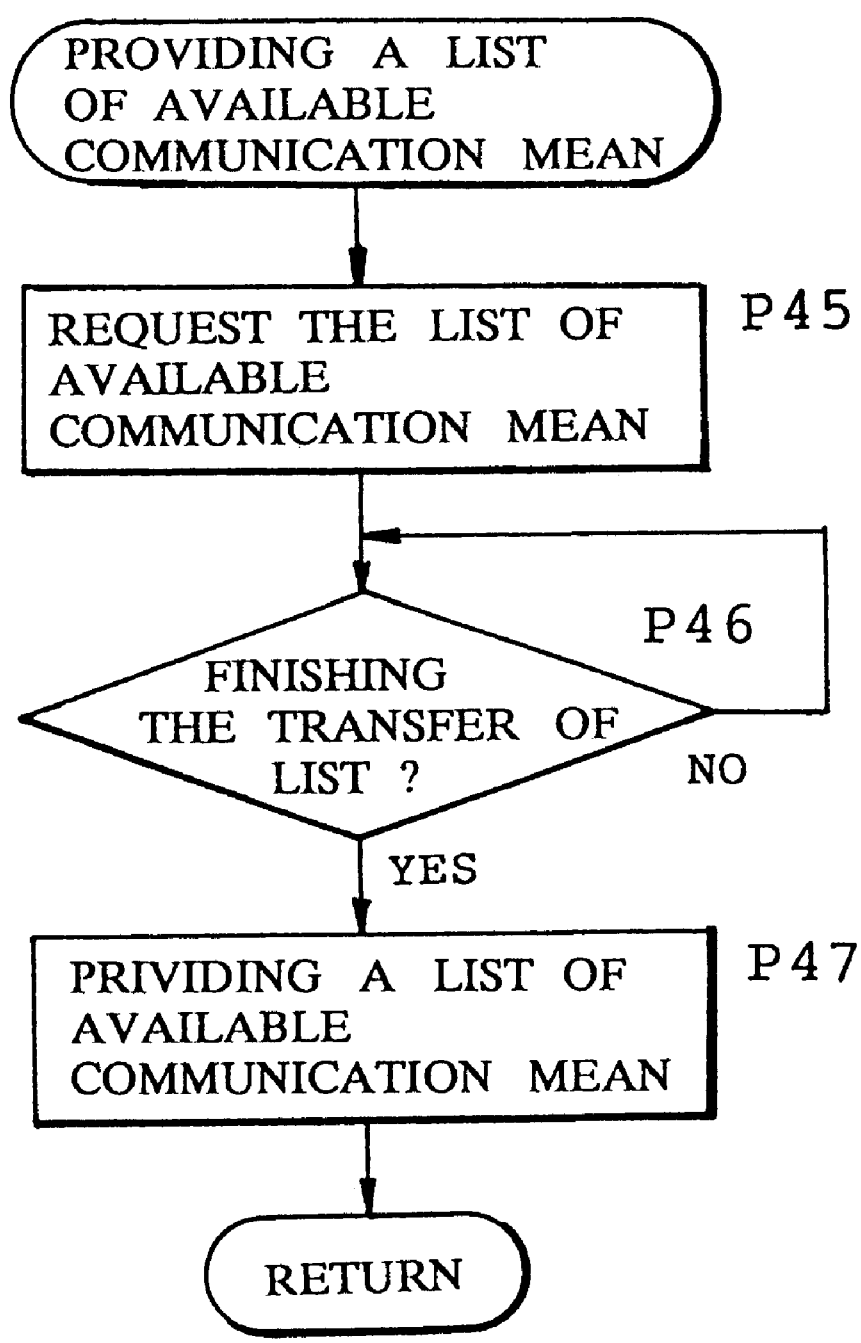
FIG. 14 is a flowchart showing the details of the processing of making a list of available communication means.

FIG. 14 is a flowchart showing the subroutine for making a list of available communication means shown by step P32 on the flowchart of FIG. 13.

The sending equipment A issue status requests to all equipments connected to the network (refer to FIG. 8, Ethernet 94) which is connected with the sending equipment A. Specifically, it requests the transfer of lists of communication means available for these equipments (step P45), and waits for the reception of the lists (step P46). On receiving the lists of available communication means from all equipments in the network, the sending equipment A adds its own available communication means to the received lists and provides the lists of communication means that are available for the transfer operation of the equipment A (step P47), and returns to the main routine.

Figure 15:
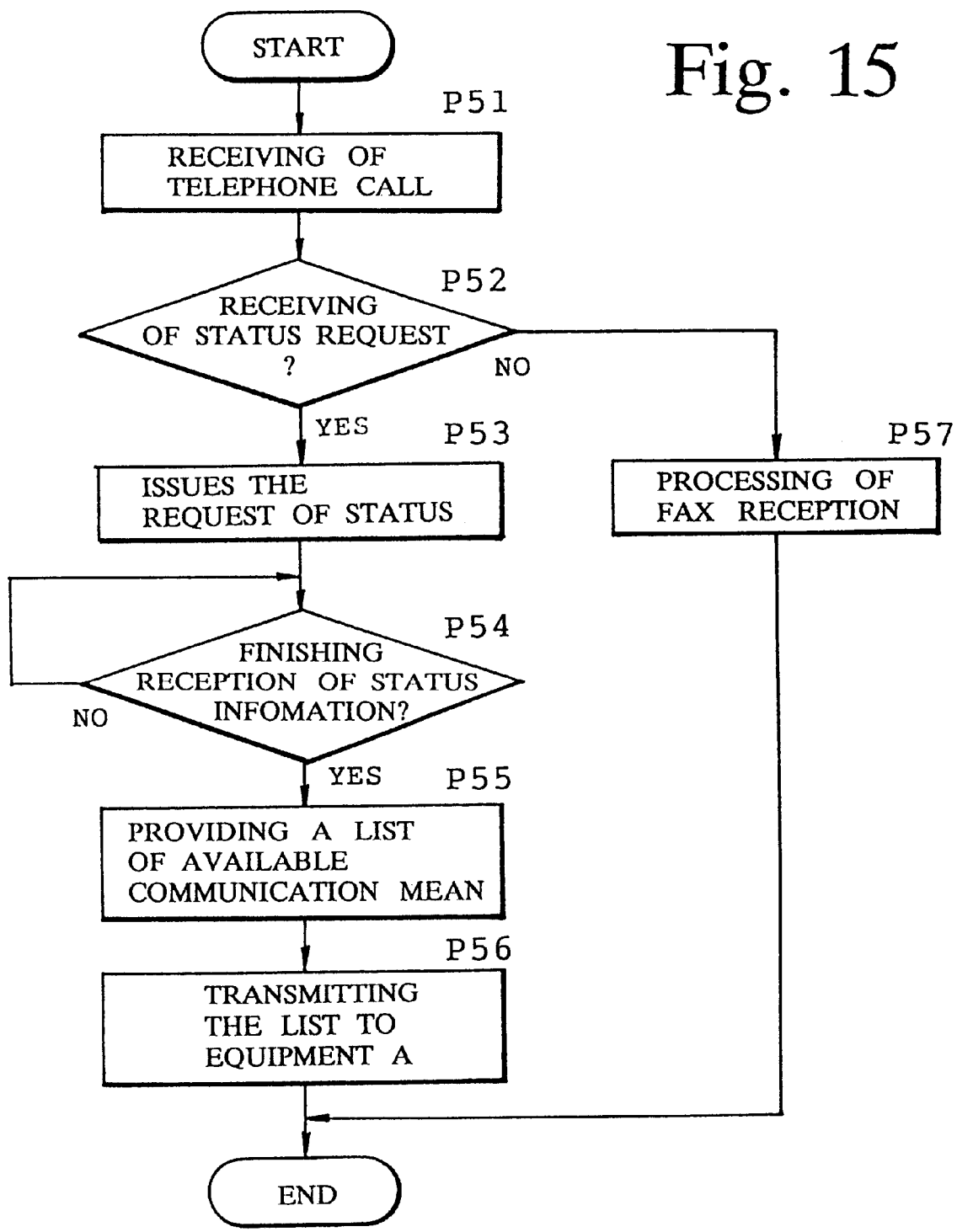
FIG. 15 is a flowchart showing the processing carried out by the CPU of the receiving equipment for sending a list of available communication means.

FIG. 15 is a flowchart showing the processing for the transfer of available communication means list and document data reception implemented by the CPU 51 of the receiving equipment B which is a personal computer 50B shown in FIG. 8. Initially, the CPU 51 receives a telephone call from a sending equipment (step P51), and judges whether it is a status request or not (step P52).

On receiving the status request, it issues status requests to all equipments connected to the network (Ethernet 95) which is connected with the sending equipment B (step P53), and waits for the reception of status information (step P54). On receiving status information from all equipments, there is provided a list of communication means available on these equipments in the network and a list of communication means available for the self equipment B (step P55). The list is transmitted to the sending equipment A (step P56), and the operation is terminated.

Otherwise, in response to the negation of the status request judgement in step P52, the processing of FAX reception is implemented (step P57), and the operation is terminated.

Figure 16:
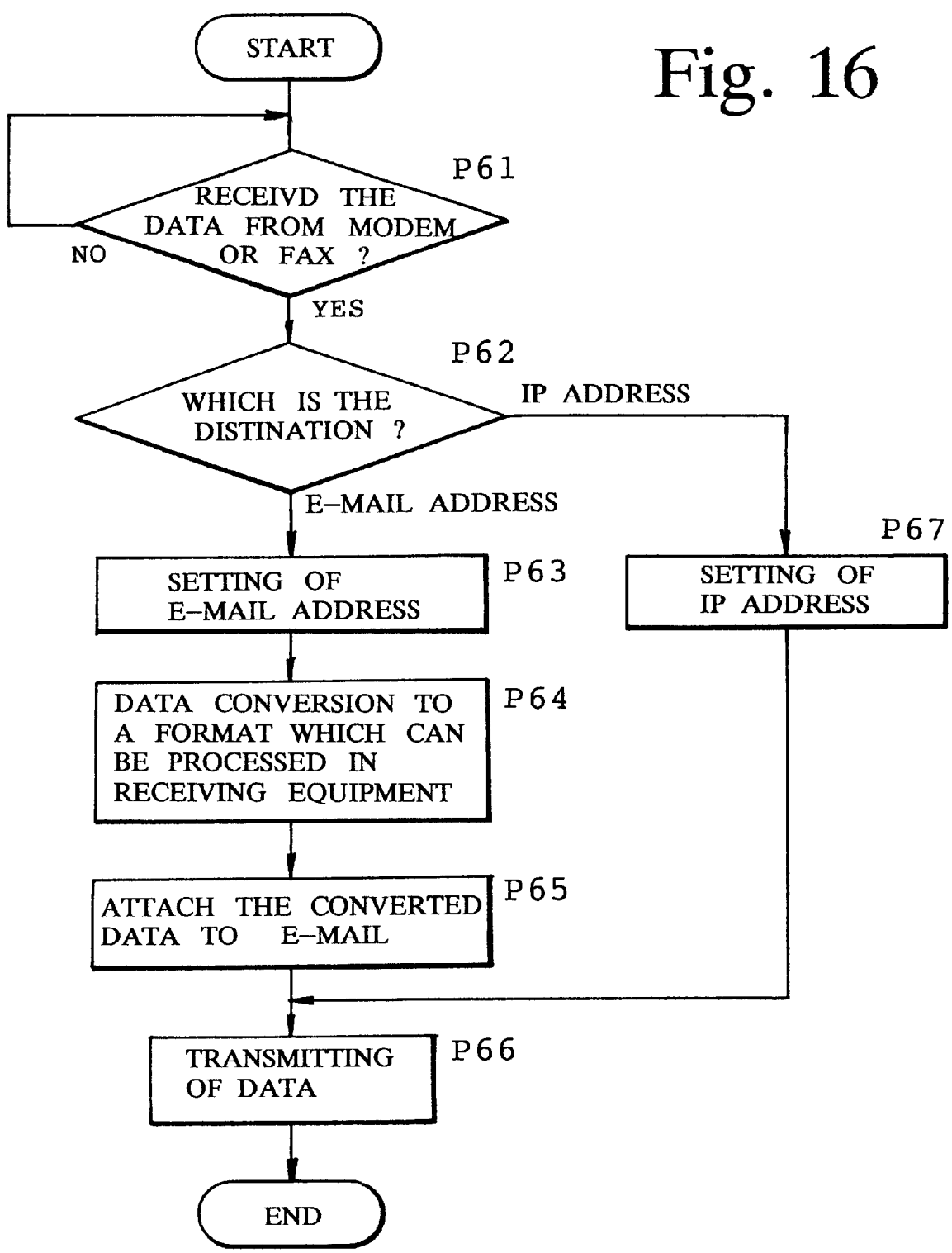
FIG. 16 is a flowchart showing the processing of transferring document data.

FIG. 16 is a flowchart showing the document data transfer process implemented by the CPU of the FAX 2 in the network shown in FIG. 8. The CPU judges whether or not the FAX 2 has received document data and information indicative of the destination from the modem A or FAX 1 (step P61). On receiving document data and destination information, it judges whether the destination is an E-mail address or IP address (Internet Protocol address) of a receiving personal computer (step P62).

When the destination information is an E-mail address in step P62, the E-mail address is set (step P63), the data format is converted so that the document data can be processed by the receiving equipment B (step P64), the converted document data is attached to an E-mail (step P65), and finally the E-mail is sent to the specified E-mail address (step P66).

In case the judgement step P62 reveals that the destination information is an IP address, the IP address is set (step P67), the document data is sent to the specified IP address based on the file transfer protocol (FTP) (step P66), and the operation is terminated. The receiving equipment B is running under the operating system (OS) which can deal with the file transfer protocol (FTP), and it receives the document data and automatically stores the data onto the hard disk of the personal computer.

Although a list of communication means that are available for communication between the sending equipment and receiving equipment are transacted by using FAX in the above explanation, the list may be transacted via other means, e.g., E-mail.

Although the communication route selection control program is stored in the hard disk of the personal computer in the above explanation of the second embodiment, this program may be stored on a floppy disk and loaded with the floppy disk drive of the personal computer into the main memory at the time of processing. This variant scheme is made possible by the provision of a floppy disk drive 56 on the personal computer 50A and the preparation of a floppy disk 56f as shown in FIG. 8.

The floppy disk for storing the communication route selection control program may be replaced with a CD-ROM, with a CD-ROM drive being provided on the personal computer obviously.

Although in the foregoing first and second embodiments, the sending equipment inquires of the receiving equipment the available communication means and produces a graphic communication route guidance (shown in FIG. 4 and FIG. 12) at each time of communication, an alternative scheme is to memorize the reply of inquiry and produces the guidance from the stored record for successive communications within a certain period of time. Inquiry of available communication means may be made at certain events, e.g., when the equipment is turned on, or on expiration of a certain time length after turn-on of the equipment, thereby to update the information of available communication means of the receiving equipment.

A conceivable preset destination equipment is an equipment which is registered with the allotment of a one-touch dial number of the usual facsimile unit.

According to the present invention arranged as described above, the user is allowed to choose a communication means and communication route among multiple available means and routes depending on the content of communication, communication speed and communication cost, whereby the user is prevented from being troubled in choosing a communication function or sending information by using a function that is not the best.

What is claimed is:

1. A communication equipment capable of sending information to a destination equipment via a plurality of communication means, said communication equipment comprising:

a finding controller which finds one or more communication means available for both said communication equipment and said destination equipment among said plurality of communication means, said one or more communication means defining a plurality of communication routes between said communication equipment and said destination equipment;

a display device which displays the communication means found by said finding controller;

an input device used to specify a communication means out of the one or more communication means displayed on said display device such that a communication route is formed between the communication equipment and the designation equipment; and a transmission controller which transmits information to said destination equipment via the communication means specified with said input device.

2. A communication equipment according to claim 1, wherein said finding controller lists one or more communication means available for said communication equipment and one or more communication means available for said destination equipment, and extracts one or more communication means available commonly for said communication equipment and said destination equipment.

3. A communication equipment according to claim 2, wherein said finding controller sends to said destination equipment a status request for inquiring the one or more communication means available for said destination equipment, and lists the one or more communication means available for said destination equipment upon receiving a reply from said destination equipment in response to the status request.

4. A communication equipment according to claim 1, wherein said finding controller lists one or more communication means available for a network, to which said communication equipment connects, and one or more communication means available for a network, to which said destination equipment connects, and extracts one or more communication means available commonly for said communication equipment and said destination equipment.

5. A communication equipment according to claim 4, wherein said finding controller sends to said destination equipment a status request for inquiring the one or more communication means available for said network to which said destination equipment connects, and lists one or more communication means available for said destination equipment upon receiving a reply from said destination equipment in response to the status request.

6. A communication equipment according to claim 1, wherein said communication means includes facsimile and electronic mail.

7. A method for selecting a communication means to be used for communication between a communication equipment and a destination equipment, said method comprising:
   finding one or more communication means available for both said communication equipment and said destination equipment, said one or more communication means defining a plurality of communication routes between said communication equipment and said destination equipment;
   displaying the communication means found in said finding;
   detecting the selection of a communication means out of the one or more communication means displayed in said displaying, said selection being such that a communication route is formed between the communication equipment and the designation equipment; and
   sending information from said communication equipment to said destination equipment via the communication means detected in said detecting.

8. A method according to claim 7, wherein said finding step includes:
   a first listing of one or more communication means available for said communication equipment;
   a second listing of one or more communication means available for said destination equipment; and
   an extraction of one or more communication means that have been listed commonly in said first and second listing.

9. A method according to claim 8, wherein said second listing includes:
   a sending of a status request, from said communication equipment to said destination equipment, for inquiring the one or more communication means available for said destination equipment; and
   a sending back of reply information indicative of the one or more communication means available for said receiving equipment. from said destination equipment to said communication equipment in response to the status request.

10. A method according to claim 7, wherein said finding step includes:
    a first listing of one or more communication means available for a network to which said communication equipment connects;
    a second listing of one or more communication means available for a network to which said destination equipment connects; and
    an extraction of one or more communication means that have been listed commonly in said first and second listing.

11. A method according to claim 10, wherein said first listing includes:
    a sending of a status request, from said communication equipment to other equipments connected to said network to which said communication equipment, for inquiring one or more communication means available for said other equipments; and
    a sending back of reply information indicative of the one or more communication means available for said other equipments, from said other equipments to said communication equipment in response to the status request.

12. A method according to claim 10, wherein said second listing includes:
    a first inquiry which includes sending of a first status request, from said communication equipment to said destination equipment, for inquiring the one or more communication means available for said network to which said destination equipment connects;
    a second inquiry which includes sending of a second status request, from said communication equipment to other equipments connected to said network to which said destination equipment in response to the first status request, for inquiring one or more communication means available for said other equipments;
    a first reply which includes sending back of reply information indicative of the one or more communication means available for said other equipments, from said other equipments to said destination equipment in response to the second inquiry; and
    a second reply which includes transferring of the reply information, which has been received in said first reply by said receiving equipment, to said communication equipment.

13. A method according to claim 10, wherein said displaying step displays the one or more communication means on a display device provided with said communication equipment.

14. A method according to claim 7, wherein said communication means includes facsimile and electronic mail.

15. A computer program product in memory for selecting a communication means to be used for communication between a communication equipment and a destination equipment, said computer program product comprising:
    a finding control for finding one or more communication means available for both said communication equipment and said destination equipment, said one or more communication means defining a plurality of communication routes between said communication equipment and said destination equipment;
    a display control for displaying the one or more communication means found by said finding control;
    a detection control for detecting the selection of the communication means to be used for said communication out of the one or more communication means displayed by said display control, said selection being such that a communication route is formed between the communication equipment and the designation equipment; and
    a transfer control for sending information from said communication equipment to said destination equipment via the communication means selected by said detection control.

16. A computer program product in memory according to claim 15, wherein said finding control includes:
    a first listing control for listing one or more communication means available for said communication equipment;

a second listing control for listing one or more communication means available for said destination equipment; and an extraction control for extracting one or more communication means that have been listed commonly by said first and second listing controls.

17. A computer program product in memory according to claim 16, wherein said second listing control includes:

inquiry control for sending a status requests from said communication equipment to said destination equipment. for inquiring the one or more communication means available for said destination equipment; and reply control for sending back, from said destination equipment to said communication equipment in response to the status request, information indicative of the one or more communication means available for said destination equipment.

18. A computer program product in memory according to claim 15, wherein said finding control includes:

a first listing control for listing one or more communication means available for a network to which said communication equipment connects;

a second listing control for listing one or more communication means available for a network to which said destination equipment connects; and an extraction control for extracting one or more communication means that have been listed commonly by said first and second listing controls.

19. A computer program product in memory according to claim 18, wherein said first listing control includes:

inquiry control for sending a status request, from said communication equipment to other equipments connected to said network to which said communication equipment connects, for inquiring one or more communication means available for said other equipments; and reply control for sending back, from said other equipments to said communication equipment in response to the status request, reply information indicative of the one or more communication means available for said other equipments.

20. A computer program product in memory according to claim 18, wherein said second listing control includes:

a first inquiry control for sending a first status request, from said communication equipment to said destination equipment, for inquiring one or more communication means available for said network to which said destination equipment;

a second inquiry control for sending a second status request, from said destination equipment to other equipments connected to said network to which said destination equipment in response to the first status request, for inquiring one or more communication means available for said other equipments;

a first reply control for sending back, from said other equipments to said destination equipment in response to the second inquiry control, reply information indicative of the one or more communication means available for said other equipments; and a second reply control for transferring the reply information, which has been received in said first reply control by said receiving equipment, to said destination equipment.

21. A computer program product in memory according to claim 15, wherein said display control includes displaying of the one or more communication means on a display device provided with said communication equipment.

22. A computer program product according to claim 15, wherein said communication means includes facsimile and electronic mail.

23. A communication apparatus comprising:

means for finding one or more means of communication available for both said communication apparatus and a destination apparatus, said one or more communication means defining a plurality of communication routes between said communication apparatus and said destination apparatus;

means for displaying on a display screen, on the basis of the one or more means of communication found by said finding means, the plurality of communication routes from said communication apparatus to said destination apparatus;

means for receiving an operator's selection of a communication route to be used for communication with said destination apparatus out of the plurality of communication routes displayed on said display screen; and means for communicating with said destination apparatus via one or more means and routes of communication determined based on the operator's selection received by said receiving means.

24. A communication apparatus according to claim 23, wherein said means of communication includes facsimile and electronic mail.

25. A method for determining optimum means and route of communication from a communicating apparatus to a destination apparatus, said method comprising:

finding one or more means of communication available for both said communication apparatus and said destination apparatus, said one or more communication means defining a plurality of communication routes between said communication apparatus and said destination apparatus;

displaying on a display screen, on the basis of the one or more means of communication found at said finding step, the plurality of communication routes from said communication apparatus to said destination apparatus;

receiving an operator's selection of a communication route to be used for the communication from said communication apparatus to said destination apparatus out of the plurality of communication routes displayed on said display screen; and determining one or more means and routes of communication on the basis of the operator's selection received at said receiving.

26. A method according to claim 25, wherein said means of communication includes facsimile and electronic mail.

27. A computer program product for determining optimum means and route of communication from a communicating apparatus to a destination apparatus, said computer program product comprising elements for carrying out the following processing of:

finding one or more means of communication available for both said communication apparatus and said destination apparatus, said one or more communication means defining a plurality of communication routes between said communication apparatus and said destination apparatus;

displaying on the basis of the one or more means of communication found at said finding processing, the plurality of communication routes from said communication apparatus to said destination apparatus on a display screen;

receiving an operator'selection of a communication route to be used for the communication from said communication apparats to said destination apparatus out of the plurality of communication routes displayed on said display screen; and determining one or more means and routes of communication on the basis of the operator's selection received at said receiving processing.

28. A computer program product according to claim 27, wherein said means of communication includes facsimile and electronic mail.

* * * * *